Patented Apr. 16, 1940

2,197,719

UNITED STATES PATENT OFFICE 2,197,719

CHEWING GUM

Herbert W. Conner, Chicago, Ill., assignor to Wm. Wrigley, Jr. Company, Chicago, Ill., a corporation of Delaware No Drawing. Application December 7, 1938, Serial No. 244,459

16 Claims. (Cl. 99—135)

My invention relates to chewing gum and is particularly concerned with the preparation of products having unusually satisfactory properties and characteristics.

In the art of preparing chewing gum, it has heretofore been customary, in order to produce products of high quality, to utilize mixtures of chicle and jelutong as the base materials, although experience has demonstrated that such bases are open to certain objections. In recent years, various products have been suggested and developed for the purpose of producing improved chewing gums with respect to texture, chew, and other properties. While these products serve a purpose, none has proven to be fully satisfactory.

The ideal chewing gum must possess various properties, among which may be mentioned, for example, smoothness, non-adhesiveness or lack of tackiness, and a proper degree of cohesiveness, resiliency, and stretch in order to make for the desired chewing characteristics. In order to achieve such properties to some degree or other, it has been more or less conventional practice to employ various materials in the chewing gum mix as, for example, paraffin wax, spermaceti, ceresin wax, candelilla wax, carnauba wax, stearine, petrolatum, cocoa butter and the like. While the use of these materials brings about improvements in certain characteristics of the final chewing gum product, usually these improvements are obtained at a sacrifice of other desired properties. Thus, for example, while ordinary paraffin wax, which has a melting point of from about 110 degrees F. to a maximum of about 149 degrees F., ordinarily of about 118 degrees F. to 130 degrees F. as usually employed in chewing gum mixes, tends to impart desired smoothness to chewing gum mixes, it also possesses the undesirable feature of rendering the final chewing gum too plastic and tacky and, in addition, it imparts other objectionable properties to the chewing gum. Again, for example, cocoa butter has a smoothing action on chewing gum mixes but, when used in sufficient quantities to achieve this function to any appreciable extent, it brings about such a substantial loss of cohesion and firmness in the chewing gum mixes as to preclude its use as a practical smoothing agent.

I have discovered that the addition of a phosphatide, as more fully set out hereinafter, to chewing gum mixes has the entirely unexpected properties of enhancing materially the smoothness of the final chewing gum product and at the same time decreasing tackiness and reducing the cohesive properties of the chewing gum to the desired extent. In such chewing gum mixes which possess a smooth chew by virtue of the selection of particular bases or blends of bases with known addition agents such as those described hereinabove, the smoothing effect of the phosphatide is, of course, not so apparent or pronounced as in the case where the chewing gum mix inherently possesses rough chewability characteristics. However, even in the case where the chew is a relatively smooth one, the employment of the phosphatide produces marked advantages with respect to reduction of tackiness and regulation of cohesiveness. This is particularly the case in connection with chewing gum mixes containing a high percentage of jelutong and other eastern guttas and the like which are characterized by high cohesiveness.

In order that those skilled in the art may even more fully appreciate the scope of the invention, I list hereinbelow specific embodiments for carrying out the novel teachings of my invention. It will be understood that these embodiments are illustrative and in no wise limitative of the full scope of my invention. Thus, for example, different base mixtures of gums, guttas, resins and the like may be utilized, with or without supplemental agents such as those previously listed, the proportions of the ingredients may be varied, and the amounts and character of the phosphatide are likewise variable within limits without departing from the spirit and teachings of my invention herein. All percentages referred to are by weight.

EXAMPLE I
Chewing gum base

| | Percent |
|---|---|
| Ester gum | 88 |
| Rubber latex solids | 10 |
| Commercial soya bean lecithin | 2 |

EXAMPLE II
Chewing gum base

| | Percent |
|---|---|
| Chicle | 30 |
| Jelutong (dry) | 60 |
| Gutta soh | 8.5 |
| Commercial soya bean lecithin | 1.5 |

EXAMPLE III
Chewing gum base

| | Percent |
|---|---|
| Partially oxidized chicle | 98 |
| Commercial soya bean lecithin | 2 |

EXAMPLE IV
Chewing gum base

| | Percent |
|---|---|
| Jelutong (dry) | 80 |
| Gutta siak | 18 |
| Commercial soya bean lecithin | 2 |

In order to prepare a chewing gum from the base materials set forth above in the illustrative examples, I proceed in accordance with well known and established practice. Thus, for example, I prepare a chewing gum mix employing about 20% of the chewing gum base, about 60% of pulverized sugar (sucrose), about 19% commercial corn syrup, and about 1% of a desired flavor. The mixture is then rolled into sheets and scored in a manner known in the art.

In the examples listed hereinabove, I have employed commercial soya bean lecithin containing approximately 20% of cocoa butter. This product is made by treating the phosphatide material with acetone to remove soya bean oil, adding cocoa butter to the phosphatide material and then evaporating off the acetone. In place of such lecithin preparations, allied or related materials may be employed such as the vegetable phosphatides derived from plant material other than soya beans, animal phosphatides derived from egg yolks, from cerebrospinal or brain tissue, and the like, and containing lecithins, cephalins, sphingomyelin, and generally similar lipoids. Again, synthetically prepared lecithins may be utilized. For commercial and other reasons, I prefer particularly to employ soya bean lecithin. It will be understood, of course, that the lecithin or phosphatides should be of proper quality to be used in food products.

It may be pointed out that commercial soya bean lecithin comprises a mixture of phosphatides, constituents of which are apparently lecithins and cephalins. By extraction of soya bean phosphatides with 95% grain alcohol, a fraction is obtained, insoluble in the alcohol, which appears to comprise mainly cephalins or to be rich in cephalins. This fraction, appears to exert at least a predominantly smoothing effect upon chewing gum mixes, whereas the alcohol-soluble fraction, presumably comprising mainly the lecithins, acts at least largely as a reducer of cohesiveness. At any rate, whatever the true relationship may be regarding the highly complex nature of the phosphatides of soya beans, it has been repeatedly demonstrated that chewing gum mixes can be considerably improved in one or more respects by the addition of phosphatides thereto regardless of whether the latter consist of substantially single chemical compounds or mixtures thereof.

As I have pointed out hereinabove, the commercial soya bean lecithin which I have found to be especially advantageous for use in my present invention is prepared by adding cocoa butter to the phosphatides which have been washed preliminarily with acetone, the acetone being evaporated from the mass after the addition of the cocoa butter. This procedure is resorted to in order to prevent the phosphatide from losing its dispersibility characteristics, a result which would tend to occur if the acetone were simply evaporated from the phosphatide without the prior addition thereto of the cocoa butter. I have found that the cocoa butter may efficaciously be replaced by a like or a greater or smaller amount of glycerin or corn syrup. In such case, the acetone is preliminarily removed with several washings of ethyl alcohol or similar organic solvent. This leaves a residue presumably comprising mainly cephalins. To this residue the corn syrup or glycerin is added to provide a cephalin-rich product, any adhering alcohol being removed by evaporation. To the alcohol solution, containing presumably the oil-free lecithins, corn syrup or glycerin is added and then the alcohol is removed by evaporation, thereby providing a lecithin-rich product. The resulting essentially fat-free phosphatide products retain their desirable properties. Either product alone may be employed in chewing gums for the attainment of the useful functions hereinabove described or the two fractions may be combined and used in that manner.

While the phosphatides may, of course, be incorporated into the chewing gum batch at any desired or suitable stage of the chewing gum manufacturing process, I have found it to be highly advantageous to effect the incorporation during the steps of purifying and clarifying the chewing gum base. In accordance with such procedure, the chewing gum base, which may be jelutong or blends of jelutong with chicle and/or other chicle substitutes, in ground and dried form, is placed in the usual pressure cooker together with the phosphatide, and with or without additional moisture, and maintained therein, with agitation, under a steam pressure sufficient to melt the mass. The melted mass is then filtered, at elevated temperatures, through a coarse mesh screen to remove large particle impurities and it is then centrifuged to clarify the same. The presence of the phosphatide results in the necessity for a lower rate of centrifuging which means that the base mixture must remain in the centrifugal bowl for a longer period of time. The procedure, however, possesses the advantage of insuring greater sedimentation and, therefore, a cleaner or purer and more fluid mass. Furthermore, the addition of the phosphatide facilitates the melting process.

It will be appreciated that where the phosphatide is mixed with corn syrup, as described hereinabove, such phosphatide preparation preferably should not be mixed with the chewing gum base as herein described since, at the elevated temperatures employed in the melting operation, usually of the order of about 300 degrees F. to 325 degrees F., the corn syrup may undergo decomposition. Hence, when using the corn syrup-phosphatide preparation, it is preferred to mix the same with the chewing gum base after the latter has been purified and at the time that the sugar and flavor and the like are mixed therewith.

The proportions of the phosphatide employed in the final chewing gum product or in the chewing gum base from which the chewing gum proper is prepared are subject to relatively wide variation. In general, proportions of the order of about 0.3% to about 5.0% of commercial soya bean lecithin (80% phosphatide and 20% cocoa butter), based on the weight of the chewing gum base, are effective, the preferred range in most cases being from about 0.7% to about 2.0%, based on the weight of the base. Calculated on the weight of the finished chewing gum product, the percentage range is of the order of about 0.06% to 1.0%, with the preferred range running from about 0.15% to about 0.4%. It will be appreciated that, in the case of the employment of phosphatides of greater or less potency or the utilization of extracts particularly rich in specific phosphatides, the proportions may be subject to still further variation. Thus, for example, in the case of the residue from the ethyl alcohol extraction of the phosphatides of soya bean oil, good smoothing effects have been obtained with percentages of the order of 0.1% to 0.2%, based on the weight of the chewing gum base, which, calculated on the finished chewing gum, amount to about 0.02% to 0.04%. It may be pointed out also that, if the phosphatide is preliminarily incorporated with the crude chewing gum base, as represents my preferred procedure as described hereinabove, more phosphatide is required to obtain the same results than if the latter is added to the previously purified chewing gum base. In the usual case, this will average about one and one-half times as much. Nevertheless, for the reasons set out hereinabove and for other reasons, the described procedure is preferred. The percentages set out hereinabove are those based upon the initial incorporation of the phosphatide into the crude chewing gum base as previously disclosed.

So far as the production of a phosphate-rich chewing gum base is concerned, the phosphatide may comprise a high percentage thereof. Thus, for example, the phosphatide may comprise as high as 90% by weight or more of the entire base or it may be as low as 10% and even much lower. In such cases, of course, these base mixtures are mixed with an additional amount of a suitable or desired chewing gum base material to bring the content of the phosphatide down to the percentage sought. In other cases, it is convenient and preferable to prepare a chewing gum base mixture containing the desired gums or guttas or the like together with the selected amount of phosphatide. To prepare a chewing gum from such a base, it is then necessary only to mix the same with the proper proportions of sugar, corn syrup, flavoring and/or other ingredients which may be desired. A particularly useful chewing gum base is one containing from about 30% to 70% of jelutong, from about 70% to 30% of chicle, and minor proportions of phosphatide, for example, from about 0.3% to about 5.0% of commercial soya bean lecithin. It will be understood, however, that other chewing gum base mixtures may be made containing varying proportions of resins, guttas, chicle and chicle substitutes, and varying proportions of phosphatides, with or without the addition of oleaginous and waxy materials such as those mentioned hereinabove.

The phosphatides may be utilized, in accordance with my novel teachings herein, to improve markedly any of the usual chewing gum bases or mixtures of any two or more thereof including, for example, in addition to those previously mentioned, gutta percha, balata, Perillo, Leche Caspi, resins and resenes including coumarone-indene resins, vinyl resins, petroleum resins, gutta katiau, mastic, kauri, dammar, and the like, with or without chicle and with or without modifying agents such as hydrogenated oils, mineral oils, paraffin, beeswax, gum arabic, stearine, and other oleaginous and waxy agents such as those heretofore mentioned and which are sometimes added to chewing gum mixes for obtaining particular effects. The present invention is of unusual ultility in connection with chewing gums prepared from chicle or jelutong or mixtures thereof. This is particularly true in the case of chicle which has undergone some oxidation whereby its ordinarily relatively smooth characteristics have suffered deterioration. The invention is also of particular importance in connection with bases such as gutta soh, gutta siak, gutta katiau, and Leche Caspi, alone or in admixture with chicle or jelutong.

Wherever the term "chewing gum material" is employed in the claims, it will be understood to cover the chewing gum bases as well as the finished chewing gum, unless the connotation otherwise expressly indicates.

While I have described my invention in detail, it will be understood that variations and modifications may be made without departing from the spirit thereof, as exemplified by the appended claims.

What I claim as new and desire to protect by Letters Patent of the United States is:

1. Chewing gum including chicle and phosphatide.
2. Chewing gum containing a minor amount of phosphatide.
3. Chewing gum containing jelutong and a minor amount of phosphatide.
4. Chewing gum containing lecithin.
5. Chewing gum containing chicle, jelutong and minor proportions of lecithin.
6. Chewing gum containing from about 0.15% to about 0.4% of commercial lecithin.
7. Chewing gum containing jelutong and lecithin.
8. Chewing gum containing jelutong, chicle and lecithin.
9. Chewing gum containing jelutong, chicle, and between about 0.06% and 1.0% of commercial lecithin.
10. A chewing gum base including lecithin.
11. A chewing gum base including lecithin and jelutong.
12. A chewing gum base including lecithin, jelutong, and chicle.
13. A chewing gum base comprising from about 30% to 70% of jelutong, about 70% to 30% of chicle, and minor proportions of lecithin.
14. Chewing gum material containing cephalin.
15. Chewing gum material containing jelutong and a minor proportion of cephalin.
16. Chewing gum material containing sphingomyelin.

HERBERT W. CONNER.